E. GEIGER.
Horse Rake.
No. 24,114.
Patented May 24, 1859.
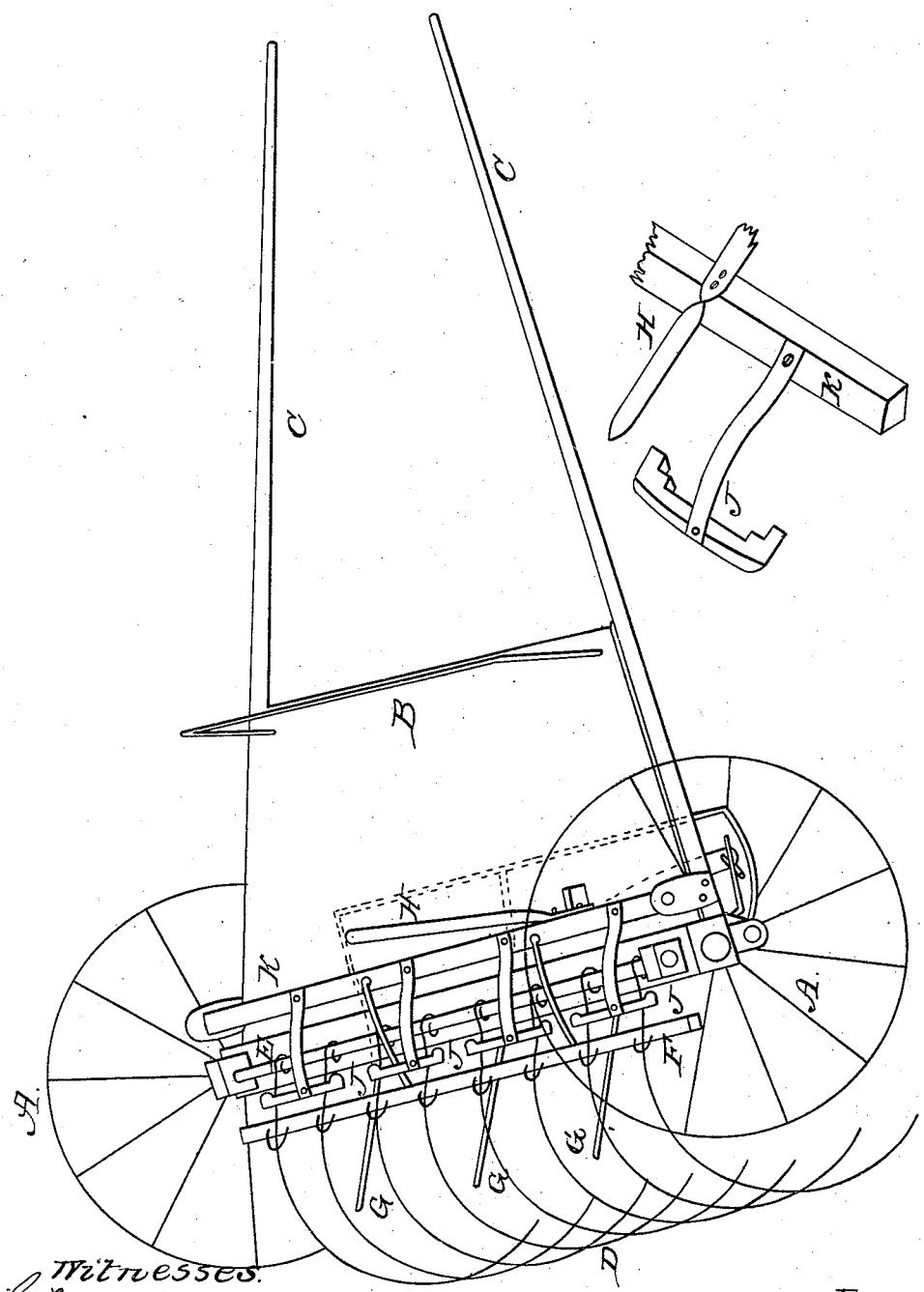

UNITED STATES PATENT OFFICE.

ELISHA GEIGER, OF LANCASTER, PENNSYLVANIA.

IMPROVEMENT IN HORSE-RAKES.

Specification forming part of Letters Patent No. 24,114, dated May 24, 1859.

*To all whom it may concern:*

Be it known that I, ELISHA GEIGER, of the city of Lancaster, county of Lancaster, and State of Pennsylvania, have invented new and useful Improvements in Horse-Rakes; and I do hereby declare that the following is a full and exact description thereof, reference being had to the accompanying drawing, and to the letters of reference marked thereon, making a part of this specification.

To enable others skilled in the art to make and use my invention, I will proceed to describe its construction and operation.

A represents the carriage-wheels; B, the platform; C, the shafts; D, the iron teeth; E, the rake-head, located immediately above the carriage-axle, and to which the teeth D are attached; F, the cross-piece which supports the teeth; G, the cleaners, which are supported by a roller suspended underneath the carriage-axle, and are vibrated and operated on by the upright lever H; J, are flat steel spring with grooved wooden heads, forming clips that rest upon and across the teeth D near the rake-head E. These springs are attached to an operating cross-bar, K, which rests upon the platform B near the carriage-axle, by which the weight of the devices is concentrated at the carriage-axle, so as to relieve the horses. The upright lever H is permanently fastened to the center of the cross-bar K, that the driver can with the greatest ease (by pressing the lever forward) raise the teeth D, the springs J, and the support F simultaneously, while the same operation throws the cleaners downward and clears the rake. The springs J prevent the teeth from rising before the rake is full, and give the rake a more regular weight and draft while passing over uneven ground.

I do not claim the teeth or the cleaners, and I am aware of spiral and other springs being attached to the teeth and to the rake-head, but these I do not claim; but

What I claim as my invention, and desire to secure by Letters Patent, is—

The arrangement of the cross-bar K, having the flat springs and heads J, and provided with arms for actuating the supporting-bar F with and in relation to the clearing rocker-shaft, the whole being constructed and operated as herein set forth.

ELISHA GEIGER.

Witnesses:
 M. CARPENTER,
 I. FRANKLIN REIGART.